United States Patent
Zolnai et al.

(10) Patent No.: US 10,751,786 B2
(45) Date of Patent: Aug. 25, 2020

(54) FRAME COMPONENT FOR A BELT WINDER AND METHOD FOR PRODUCING SAME

(71) Applicant: TRW AUTOMOTIVE GMBH, Alfdorf (DE)

(72) Inventors: Udo Zolnai, Schwäbisch Gmünd (DE); Friedrich Littau, Rienharz (DE); Erwin Fauser, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 790 days.

(21) Appl. No.: 15/313,694

(22) PCT Filed: May 26, 2015

(86) PCT No.: PCT/EP2015/001071
§ 371 (c)(1),
(2) Date: May 11, 2017

(87) PCT Pub. No.: WO2015/185191
PCT Pub. Date: Dec. 10, 2015

(65) Prior Publication Data
US 2017/0259780 A1    Sep. 14, 2017

(30) Foreign Application Priority Data
Jun. 6, 2014   (DE) .......................... 10 2014 008 139

(51) Int. Cl.
*B21J 5/12* (2006.01)
*B21J 5/08* (2006.01)
(Continued)

(52) U.S. Cl.
CPC ................ *B21J 5/12* (2013.01); *B21D 53/28* (2013.01); *B21J 5/08* (2013.01); *B60R 22/34* (2013.01); *B60R 2022/3402* (2013.01)

(58) Field of Classification Search
CPC .. B21J 5/12; B21J 5/08; B21D 11/085; B21D 53/28
See application file for complete search history.

(56) References Cited

U.S. PATENT DOCUMENTS

2014/0001299 A1*   1/2014   Meyer ................... B60R 22/405
242/384.6

FOREIGN PATENT DOCUMENTS

| EP | 1038609 | 9/2000 |
| GB | 2288554 | 10/1995 |
| JP | 8141676 | 6/1996 |

OTHER PUBLICATIONS

EPO Machine Translation of JP 08141676 (Year: 2019).*

* cited by examiner

*Primary Examiner* — Pradeep C Battula
(74) *Attorney, Agent, or Firm* — Tarolli, Sundheim, Covell & Tummino LLP

(57) ABSTRACT

The invention describes a method of manufacturing a substantially plate-shaped frame member (10) of a belt retractor including locking teeth (18). A plate-shaped element (24) is provided, wherein said element is plastically reshaped in portions so that a portion (28) thickened into a main portion (12) of the plate-shaped element (24) is formed. Furthermore, locking teeth (18) are produced in the thickened portion (28) so that the locking teeth (18) have a larger thickness than the plate-shaped element (24) prior to reshaping. Moreover, a frame member (10) for a belt retractor is described.

9 Claims, 4 Drawing Sheets

(51) Int. Cl.
*B21D 53/28* (2006.01)
*B60R 22/34* (2006.01)

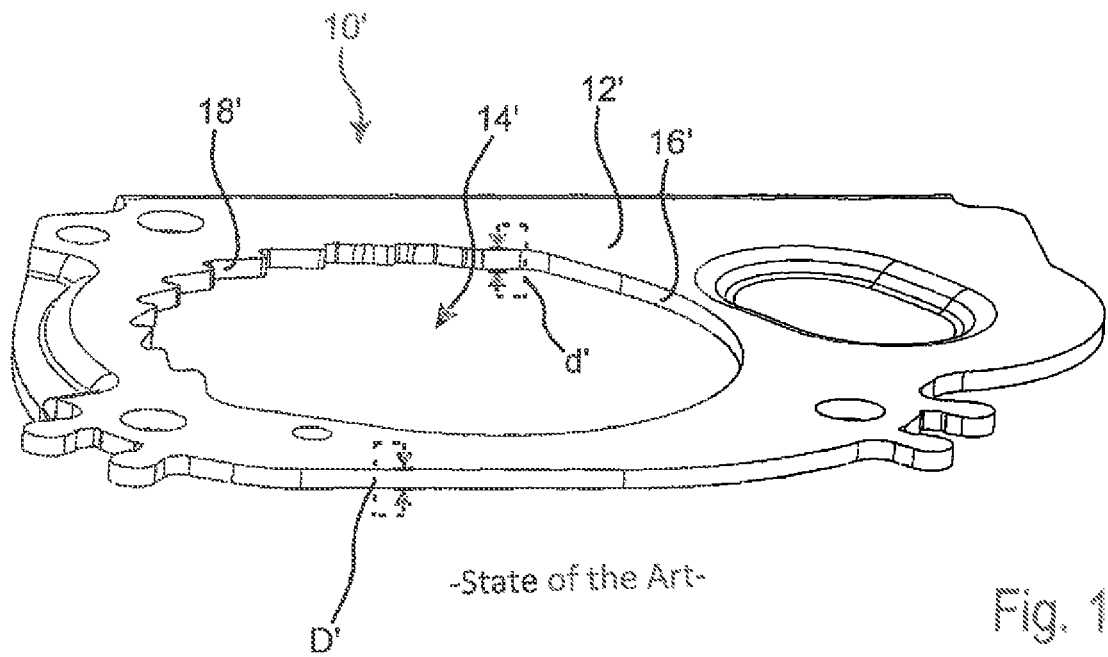
Fig. 1 -State of the Art-
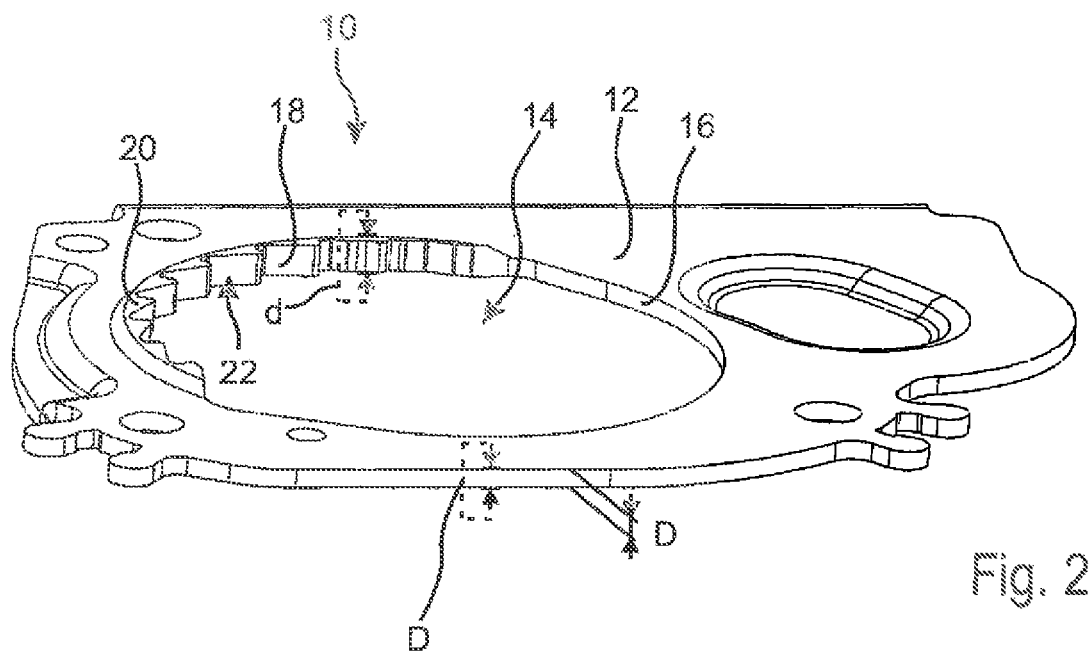
Fig. 2

FRAME COMPONENT FOR A BELT WINDER AND METHOD FOR PRODUCING SAME

RELATED APPLICATIONS

This application corresponds to PCT/EP2015/001071, filed May 26, 2015, which claims the benefit of German Application No. 10 2014 008 139.7, filed Jun. 6, 2014, the subject matter of which are incorporated herein by reference in their entirety

BACKGROUND OF THE INVENTION

The invention relates to a frame member for a belt retractor and a method of manufacturing a substantially plate-shaped frame member of a belt retractor.

A belt retractor typically includes a belt reel to which webbing that can be reeled up and unreeled from the belt reel is fastened. The belt reel is supported on the frame members of the belt retractor. In the case of crash webbing is to be prevented from being unreeled from the belt reel. For this purpose, a locking mechanism is usually provided which may comprise a ratchet arranged on the belt reel as well as locking teeth formed on the frame member. The ratchet is controlled in a vehicle and/or webbing sensitive manner within the locking teeth so that the belt reel is blocked and the webbing is not allowed to unreel any further. The ratchet may engage due to its inertia. Instead of the ratchet, the belt reel may also include counter teeth interacting with the locking teeth on the frame member. The belt reel is displaced by reason of the forces occurring so that the teeth enter into mutual engagement and the belt reel is blocked.

Upon locking the belt reel high forces will occur between the locking teeth on the frame member and the counter teeth or the ratchet, said forces entailing high load in the form of a high surface pressure on the corresponding contact faces. The surface pressure is dependent on the force occurring and the available contact face and significantly determines the selection of the materials used for the respective component parts. The component parts used in the belt retractor are made of materials having an as low density as possible, while the component parts still have to resist the surface pressures to be expected.

SUMMARY OF THE INVENTION

It is the object of the invention to provide a method of manufacturing a frame member for a belt retractor and a frame member which enables the loads occurring on the frame member when the belt reel is locked to be reduced.

According to the invention, the object is achieved by a method of manufacturing a substantially plate-shaped frame member of a belt retractor including locking teeth, the method comprising the following steps of:
a) providing a plate-shaped element;
b) plastically reshaping the plate-shaped element in portions so that a portion thickened into the main portion of the plate-shaped element is formed, and
c) producing locking teeth in the thickened portion so that the locking teeth have a larger thickness than the element prior to reshaping.

The basic idea of the invention consists in reducing the surface pressure by the fact that the locking teeth are formed on the frame member of the belt retractor in a thickened portion so that the contact face for the counter teeth or the ratchet of the belt reel is enlarged. Since the surface pressure is inversely proportional to the contact face, the surface pressure is appropriately reduced when the contact surface is enlarged. The method according to the invention moreover ensures that the thickened portion is manufactured in a simple manner, as it is formed merely by plastic reshaping. The residual portion of the frame member or almost the entire residual portion may retain the thickness of the original element and is referred to as main portion. In addition, the reshaping in portions results in the fact that the thickened portion is formed on the frame member in one piece, thus allowing high forces to be absorbed. Since only the area of the locking teeth is thickened, the frame member still has a low total weight.

Another aspect of the invention provides that the element will be drawn in step b) and will subsequently be upset or pressed in the drawn portion so as to produce a chamfer. The chamfer produced in this way at the same time forms the thickened portion. In addition, drawing and upsetting or pressing constitute plastic reshaping methods which are easy to realize.

In particular, after drawing an opening is produced in the element in the area of the rim of the thickened portion, with the locking teeth being formed on the rim of the opening. The opening is associated with an area in which the belt reel will be arranged so that the counter teeth or the ratchet formed on the belt reel are capable of interacting with the locking teeth on the rim of the opening. The element moreover can be pressed or upset more easily via the opening produced so that the entire manufacturing method is facilitated.

The die roll is dependent on the ductility of a material A cold rolled strip having low elongation at break or else low reduction in area exhibits a considerably smaller die roll. By thickening the sheet metal, the later cutting area exhibits high cold solidification and thus also a smaller die roll, which will additionally increase the percentage contact area.

In accordance with an aspect of the invention, it is further provided that the rim of the opening is trimmed after upsetting. In this way, the individual teeth of the locking teeth can be formed. Moreover, it can be safeguarded that the locking teeth have planar contact faces so that the counter teeth or the ratchet are/is in full-surface contact with the locking teeth. Further, the surface pressure occurring is distributed more homogenously due to the planar contact faces.

Another aspect of the invention provides that the plate-shaped element includes an opening the rim portion of which is reshaped in step b), especially such that the thickened portion projects substantially perpendicularly from the main portion. The reshaped rim portion at the same time constitutes a chamfer toward the main portion. By reshaping the rim portion of the opening the later thickness and width of the locking teeth can be adjusted, wherein the latter are dependent on the length of the reshaped rim portion.

Especially the outer radius in the transition area is reduced from the rim portion toward the adjacent main portion after drawing by pressing. The outer radius between the main portion and the reshaped rim portion is reduced, where possible, so far that a right angle is resulting. The outer radius is the radius which the reshaped area exhibits on the side of the element facing away from the opening. By reducing the outer radius a folding edge may be formed around which the thickened portion or the chamfer may be easily bent.

Another aspect of the invention provides that the upsetting is carried out by means of a punching die which acts primarily on the thickened portion. By means of the punching die the reshaped or thickened portion can be upset in a simple manner. The punching die can press on the end face of the reshaped portion so that the latter bends around the folding edge formed before. In addition, by upsetting the area between the main portion and the reshaped portion is rendered more compact and stable. The punching die may cause impact extrusion of the thickened portion.

Especially, after step b) the thickened portion has a width which is larger than the thickness of the element prior to reshaping. This ensures the locking teeth to exhibit not only a larger contact face but also a sufficient width so that the formed locking teeth remain stable upon engagement of the ratchet and in this way are adapted to absorb higher forces.

Furthermore, the invention relates to a frame member for a belt retractor comprising locking teeth adapted to interact with a ratchet or counter teeth, wherein the locking teeth are thicker than the residual frame member and the frame member and the locking teeth together are integrally formed. It is possible by means of such frame member to reduce the surface pressure that occurs upon inhibiting the movement of rotation of a belt reel provided in the belt retractor. In this way, the service life of a belt retractor manufactured in this way is increased while the same materials are used, because the loads occurring upon locking the belt reel are reduced. As an alternative, for the locking teeth and the counter teeth or the ratchet more suitable, softer and/or lighter materials may be used so that the weight of the entire belt retractor can be reduced.

Another aspect of the invention provides that the locking teeth have a material thickness which is at least 10% thicker, especially at least 20% thicker than that of the frame member. Such increase in the contact face is sufficient to significantly reduce the surface pressure and the loads associated therewith.

BRIEF DESCRIPTION OF THE DRAWINGS

Further advantages and characteristics of the invention will be evident from the description that follows and the drawings which will be referred to and in which:

FIG. 1 shows a frame member for a belt retractor according to the state of the art, FIG. 2 shows a frame member for a belt retractor according to the invention.

DESCRIPTION

Figure 3A:
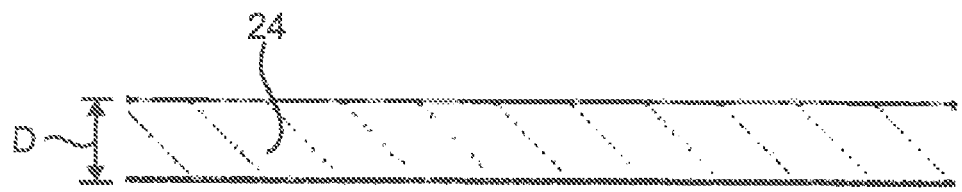
FIGS. 3a to 3e show method steps according to the invention for manufacturing a frame member of a belt retractor according to a first variant.
Figure 3B:
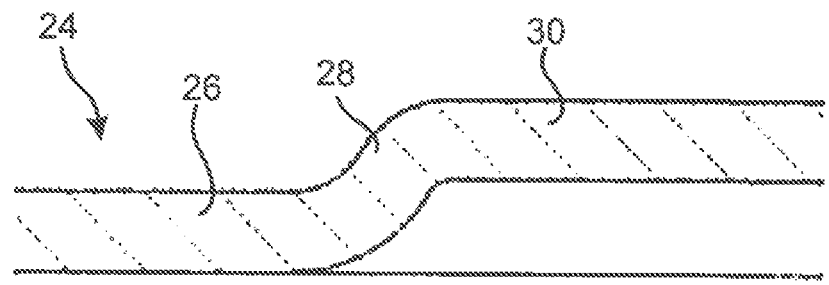

FIG. 1 illustrates a frame member 10' for a seat belt retractor according to the state of the art. The frame member 10' consists of a plate-shaped main portion 12' in which an opening 14' is provided. The opening 14' includes a peripheral rim 16' on which locking teeth 18' are formed in portions. The thickness d' of the locking teeth 18' corresponds to the thickness D' of the main portion 12' and of the entire frame member 10'.

In FIG. 2 a frame member 10 according to the invention is illustrated which has been manufactured by means of a method according to the invention. In FIGS. 3a to 3e and 4a to 4g two exemplary methods of manufacturing such frame member 10 are shown.

The frame member 10 includes, analogously to the frame member 10' known from the state of the art, a planar main portion 12 as well as an opening 14 including a peripheral rim 16 on which at least in portions locking teeth 18 are provided. The frame member 10 has a substantially plate-shaped design.

In contrast to the frame member 10' known from the state of the art, the locking teeth 18 are formed on a thickening 20 of the frame member 10, however, which is formed in one piece with the residual frame member 10 and the main portion 12. In this way a larger contact face 22 of the locking teeth 18 is resulting as compared to the locking teeth 18' known from the state of the art. The larger contact face 22 entails a reduction of the surface pressure of the locking teeth 18 and of counter teeth or a ratchet not shown. The thickness d of the locking teeth 18 is larger than the thickness D of the main portion 12 or the residual frame member 10 by at least 10%, especially by at least 20%.

From FIG. 2 one can further infer that the locking teeth 18 extend only over a part of the rim 16, i.e. a partial periphery, wherein said part corresponds to the thickening 20. Thus the frame member 10 is configured in a material-saving manner despite the thickening 20 and a simultaneously enlarged contact face 22 of the locking teeth 18.

In FIGS. 3a to 3e method steps of an exemplary manufacturing process are illustrated by which the frame member 10 including the thickening 20 is manufactured. All of FIGS. 3a to 3e in cross-section show a cutout of a plate-shaped element 24 which serves as a starting material for the frame member 10 and is reshaped into the frame member 10 illustrated in FIG. 2.

In FIG. 3a the plate-shaped element 24 is illustrated in its initial condition. The plate-shaped element 24 has the thickness D which the later main portion 12 exhibits (FIG. 2). In addition, the plate-shaped element 24 is typically formed as a sheet metal member, for example a steel sheet member.

In a first method step the plate-shaped element 24 is drawn so that after drawing it includes a first part 26, a transitional area or thickened portion 28 as well as a second part 30 (FIG. 3b), the second part 30 being drawn out of the main portion 12. In this way, the two parts 26, 30 are generally provided on two different levels and are interconnected by the thickened portion 28. The thickened portion 28 already partially corresponds to the thickening 20 of the finished frame member 10 (cf. FIG. 2). In total, the plate-shaped element 24 is S or Z shaped in cross-section after drawing in the transitional area of the parts 26, 30.

Figure 3C:
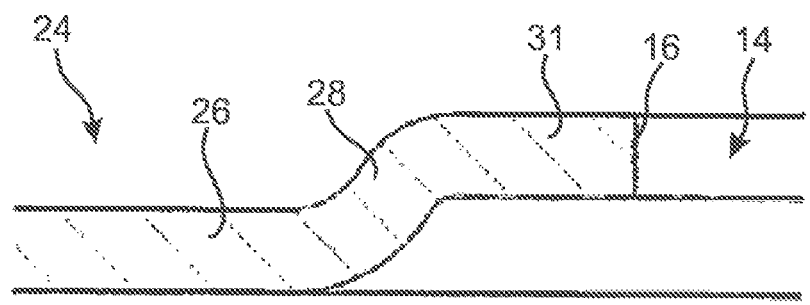

After drawing the plate-shaped element 24 and forming the thickened portion 28 associated therewith the opening 14 is produced in the substantially plate-shaped element 24 (FIG. 3c). This may be performed by punching, for example. The opening 14 is configured in the second part 30 in the vicinity of the thickened portion 28, wherein the opening 14 almost completely cuts out the second part 30. Merely a projection 31 constituting a remainder of the second part 30 is retained which is later required partially for forming the thickening 20.

The second part 30 therefore preferably includes a surface which substantially corresponds to that of the later opening 14 within the frame member 10 (FIG. 2).

Figure 3D:
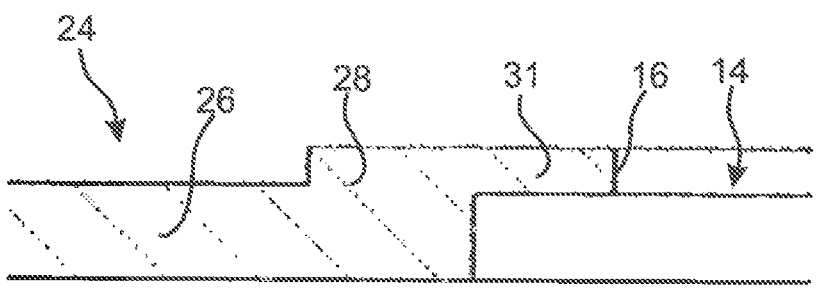

The opening 14 exhibits toward the plate-shaped element 24 the rim 16 over which the element 24 may be subsequently upset or pressed in a simple manner so as to form the thickening 20 from the thickened portion 28 and a major part of the projection 31 (FIG. 3d).

Figure 3E:
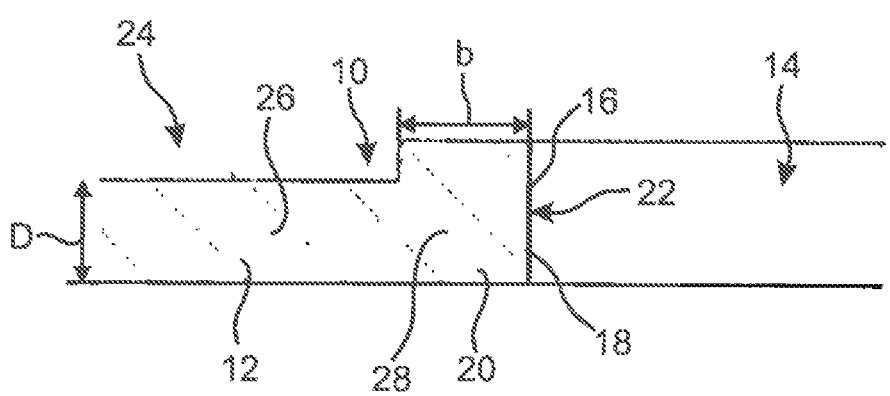

After that, the element 24 is trimmed in the area of the rim 16 so that the final shape is resulting (FIG. 3e). Upon trimming the thickened portion 28 is trimmed partially and the residual projection 31 is trimmed completely so that a straight rim 16 is resulting.

Upon trimming furthermore the teeth of the locking teeth 18 may be formed and the contact faces 22 thereof which a ratchet or counter teeth can contact as fully as possible may be cut to be planar.

By plastically reshaping by means of drawing and upsetting or pressing the plate-shaped element 24 the thickening 20 is moreover formed over a width b which is larger than the thickness D of the element 24 prior to reshaping.

By the method steps shown in FIGS. 3a to 3e a frame member 10 including the locking teeth 18 formed at the thickening 20 has been manufactured from the plate-shaped element 24 shown in FIG. 3a.

The FIGS. 4a to 4g illustrate an alternative method of manufacturing the frame member 10, wherein in FIGS. 4a to 4g a plate-shaped element 24 is shown in cross-section which is reshaped into the frame member 10 including the thickening 20 as shown in FIG. 2.

Figure 4A:
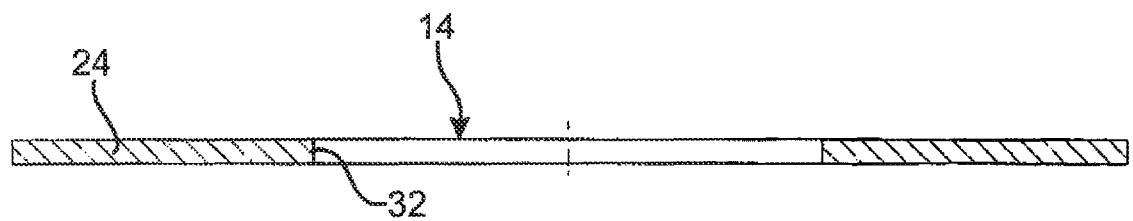
FIGS. 4a to 4g show method steps for manufacturing a frame member of a belt retractor according to a second variant.

In FIG. 4a the plate-shaped element 24 is illustrated in the initial condition, the plate-shaped element 24 already including the opening 14 which has a rim portion 32. The plate-shaped element 24 may equally be a sheet metal part, especially a steel sheet part.

Figure 4B:
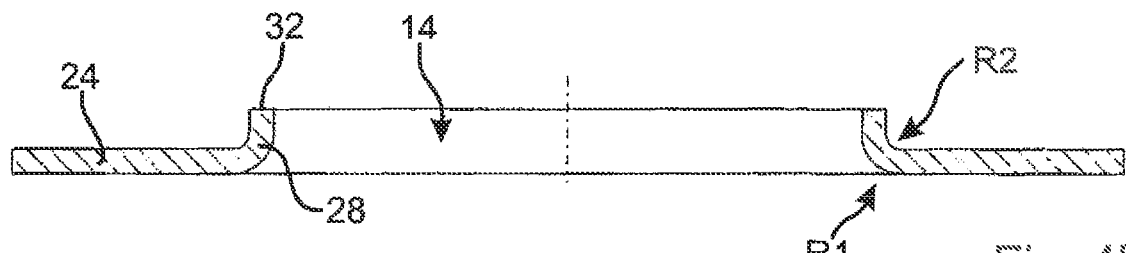

In a first method step, the rim portion 32 is bent so that it projects perpendicularly from the residual plate-shaped element 24 or the later main portion 12 (FIG. 4b). The reshaped rim portion 32 forms a chamfer which at the same time constitutes the thickened portion 28. The thickened portion 28 corresponds to part of the later thickening 20.

By chamfering or reshaping the rim portion 32 an inner radius and an outer radius R1, R2 are resulting in the transitional area from the part of the element 24 which has not been reshaped to the thickened portion 28. The inner radius R1 is formed on the side of the element 24 facing the opening 14, whereas the outer radius R2 is formed on the opposite side of the element 24.

Figure 4C:
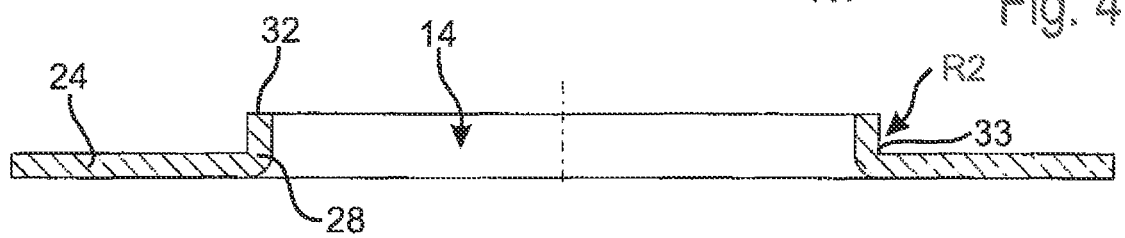

In a further method step the outer radius R2 is reduced at the thickened portion 28 in the transitional area from the reshaped rim portion 32 to the main portion 12 by upsetting and appropriate tools, for example, so that an approximately right angle is formed (FIG. 4c). In this way a folding edge 33 is formed around which the chamfered or drawn rim portion 32 later can be easily folded.

Figure 4D:
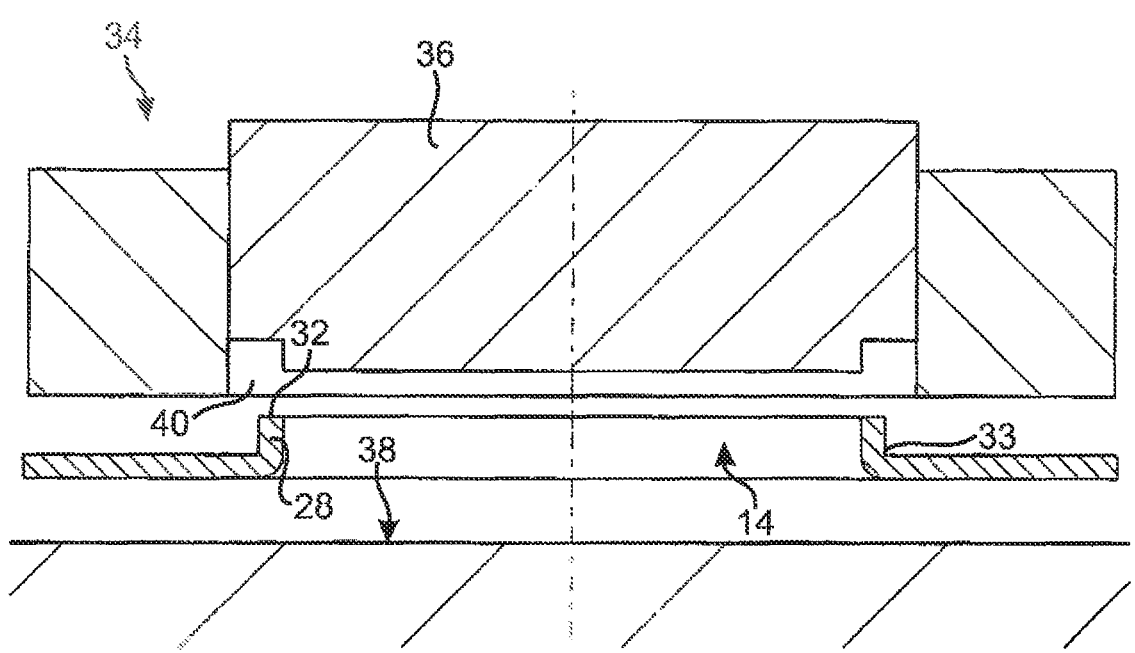
Figure 4E:
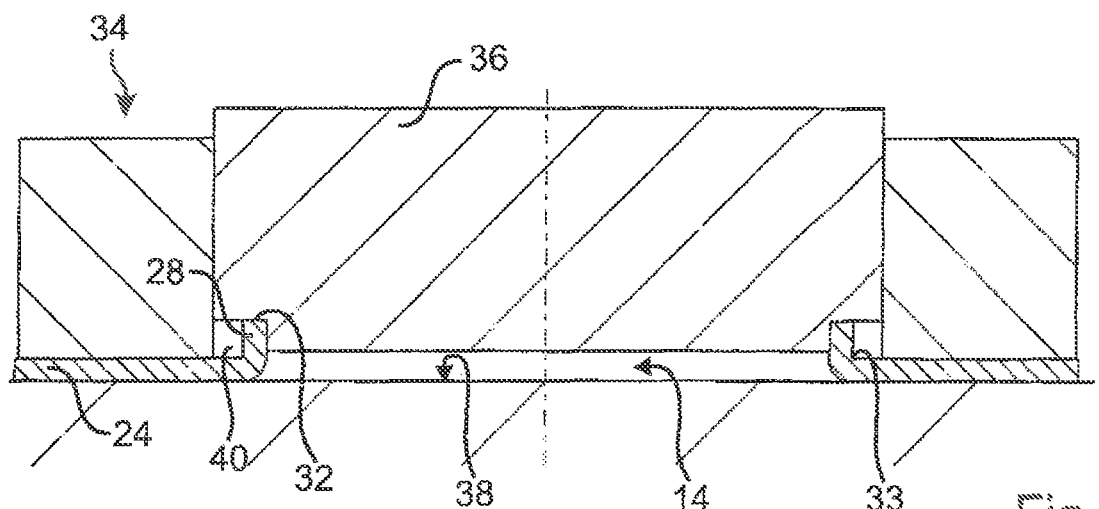

After forming the reshaped rim portion 32 and reducing the outer radius R2, the thickening 20 is made in that the element 24 including the reshaped rim portion 32 is inserted in a tool 34 including a pressing plate or a punching die 36 as well as a locating surface 38 (FIG. 4d). The punching die 36 is configured so that it includes recesses 40 which are provided for the thickened portion 28 and, resp., the reshaped rim portion 32 (FIG. 4e).

Figure 4F:
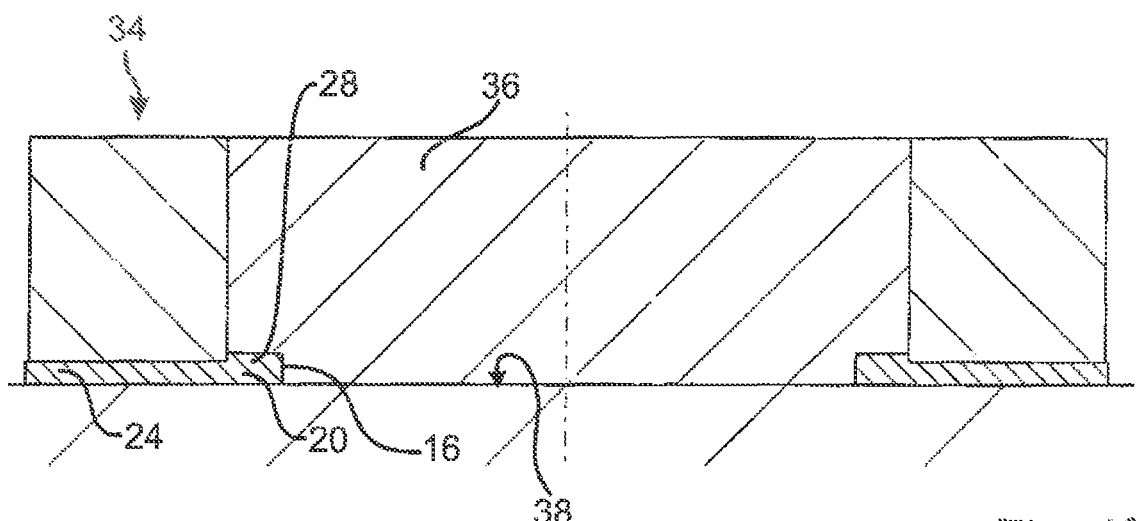

The element 24 rests on the locating surface 38 so that when a predetermined pressure is exerted the reshaped rim portion 32 is upset or pressed so that the latter is reshaped around the folding edge 33 facing away from the opening 14 (FIG. 4f). The pressing operation may be impact extrusion, for example, so that a thickening 20 integrally formed of at least two portions is resulting.

Figure 4G:
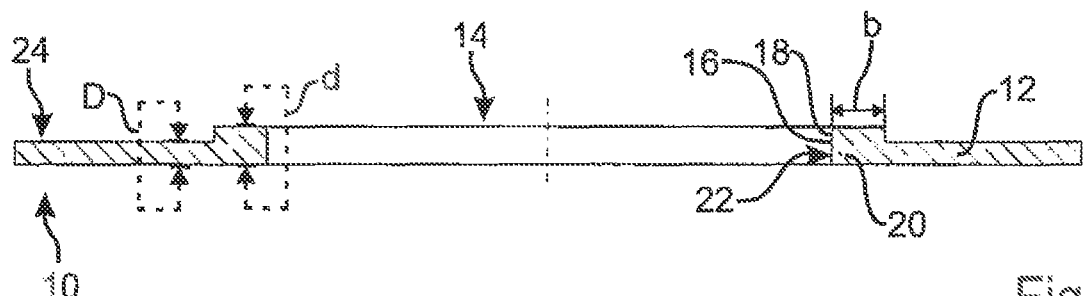

After reshaping the rim portion 32 by means of the tool 34 the plate-shaped element 24 is reshaped such that it includes the thickening 20 having the thickness d and the width b (FIG. 4g). The thickening 20 includes the rim 16 on which the locking teeth 18 have been formed so that in total locking teeth 18 having a larger contact face 22 are resulting, as is illustrated in the frame member 10 in FIG. 2.

In the illustrated embodiments the width b is larger than the thickness D.

The invention claimed is:

1. A method of manufacturing a substantially plate-shaped frame member (10) of a belt retractor including locking teeth (18), comprising the following steps of:
    a) providing a plate-shaped element (24) having oppositely facing first and second surfaces,
    b) plastically reshaping said plate-shaped element (24) in portions so that a portion (28) thickened into a main portion (12) of the plate-shaped element (24) is formed, the thickened portion (28) having a thickness (d) that is greater than a thickness (D) of non-plastically reshaped portions of the plate-shaped element (24), the thicknesses (d, D) of the thickened portion (28) and the non-plastically reshaped portions extending in a direction perpendicular to the first and second surfaces of the plate-shaped element (24) from the first surface to the oppositely facing second surface, and
    c) producing locking teeth (18) in said thickened portion (28) so that the locking teeth (18) have a larger thickness (d) than the thickness of the non-plastically reshaped portions of the plate-shaped element (24), the thickness (d) of the locking teeth (18) being equal to the thickness (d) of the thickened portion (28) so that the thickness of the locking teeth extends from the first surface of the plate-shaped member (24) to the oppositely facing second surface of the plate-shaped member.

2. The method according to claim 1, wherein that in step b) the plate-shaped element (24) is drawn and subsequently upset or pressed in the drawn portion so as to produce a chamfer (20).

3. The method according to claim 2, wherein after the plate-shaped element (24) is drawn, an opening (14) is produced in the plate-shaped element (24) adjacent to the thickened portion (28), with the locking teeth (18) being formed on a rim (16) of the produced opening (14).

4. The method according to claim 3, wherein after upsetting the plate-shaped element (24), the rim (16) of the opening (14) is trimmed.

5. The method according to claim 3, wherein the thickened portion (28) is formed to extend only over a partial periphery of the rim (16) of the opening (14), the locking teeth (18) being produced in the thickened portion (28) to extend only over a partial periphery of the rim (16) of the opening (14).

6. The method according to claim 2, wherein upsetting is carried out by means of a punching die (36) which acts primarily on the thickened portion (28).

7. The method according to claim 1, wherein the plate-shaped element (24) includes an opening (14), a rim portion (32) of the opening (14) being reshaped in step b) such that the thickened portion (28) projects substantially perpendicularly from the main portion (12).

8. The method according to claim 7, wherein after the plate-shaped element (24) is drawn, an outer radius (R2) of the thickened portion (28) is reduced by pressing in the thickened portion (28) from a rim portion (32) to the adjacent main portion (12).

9. The method according to claim 1, wherein after step b), the thickened portion (28) exhibits a width (b) which is larger than the thickness (D) of the plate-shaped element (24) prior to reshaping.

* * * * *